United States Patent Office 3,049,047
Patented Aug. 14, 1962

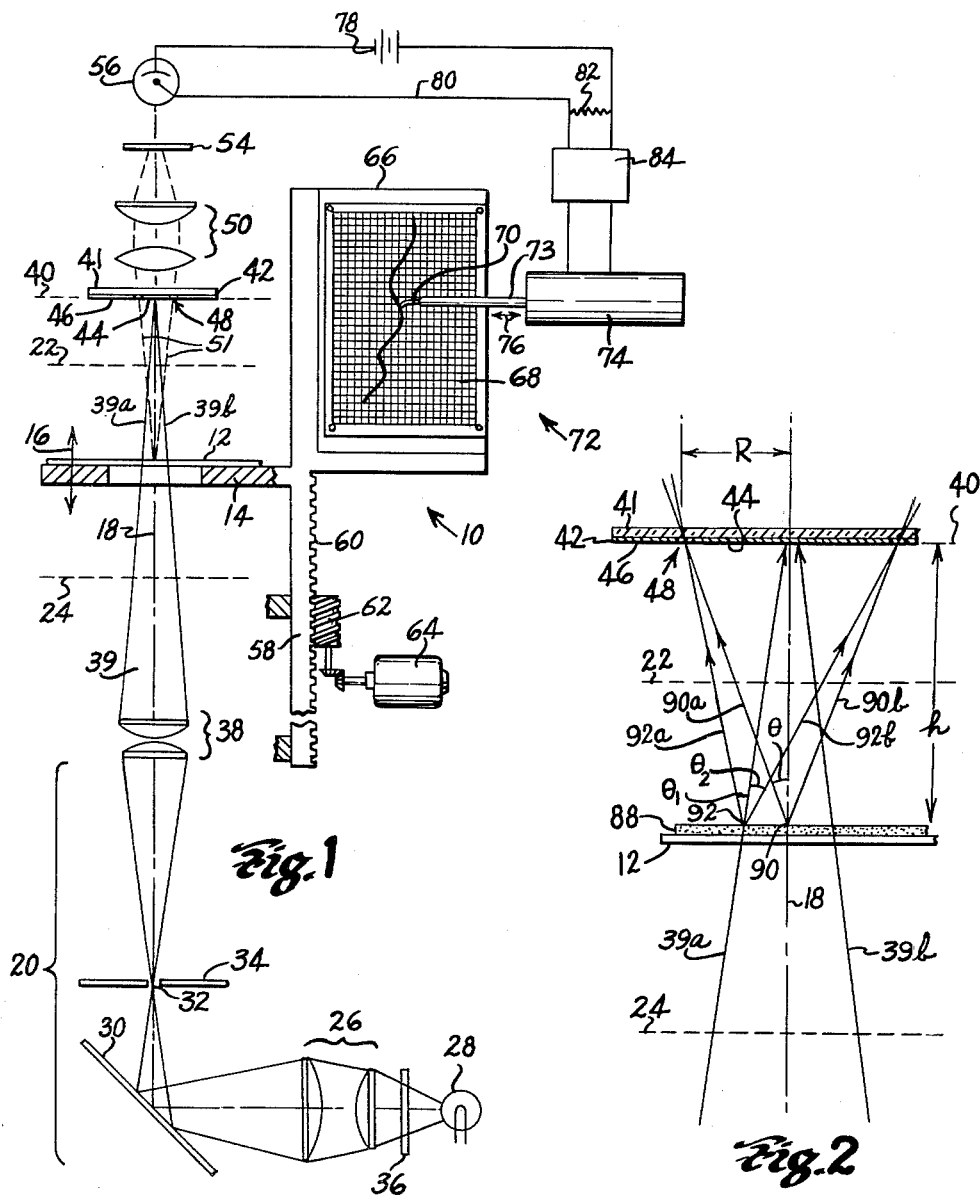

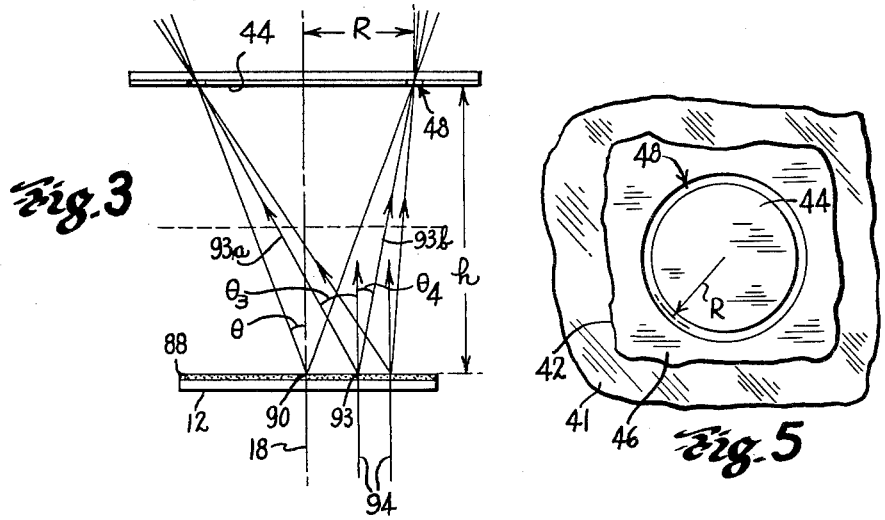
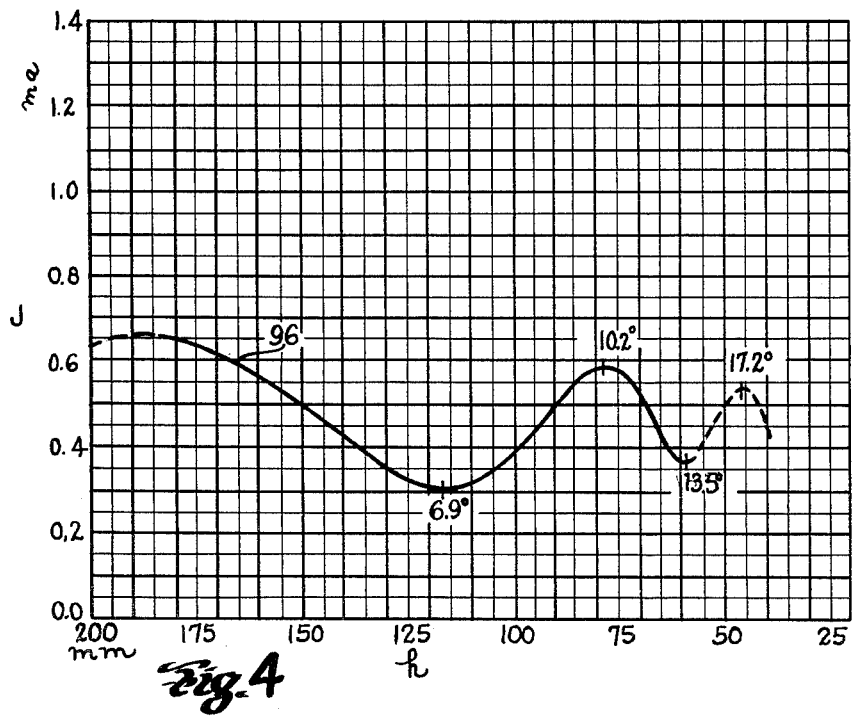

3,049,047
METHOD FOR ANALYZING MICROSCOPIC
PARTICLES AND THE LIKE
Michael L. Polanyi, Webster, and James E. Johnston, Southbridge, Mass., and Morden G. Brown, Woodstock, Conn., assignors to American Optical Company, Southbridge, Mass., a voluntary association of Massachusetts
Original application Apr. 3, 1957, Ser. No. 650,518, now Patent No. 2,969,708, dated Jan. 31, 1961. Divided and this application Dec. 5, 1960, Ser. No. 73,741
4 Claims. (Cl. 88—14)

This invention relates to a method for analyzing certain physical properties of a very large number or collection of very small or microscopic objects, particles or bodies either uniformly arranged, or distributed at random but in fairly close relation to one another and with said bodies or the like either separated by air or other transparent medium the refractive index of which may be unknown. More particularly and in keeping with the above conditions, the invention relates to a method by which a pattern of scattered light, whether same be due to diffraction, dispersion, refraction, internal reflection or the like, or any combination thereof, may be produced and rapidly analyzed to accurately indicate values of said physical properties.

An example wherein the method of the present invention finds real utility is in the analyization of certain physical properties of human blood such as determining average volume of individual red blood cells in a solution and the refractive index thereof.

It will be appreciated, however, from the description which follows that while the apparatus and method described at some length herein are in the main directed to blood analysis, the invention, with minor changes and/or adjustments as set forth below, may also be used in analyzing other collections of microscopic bodies, particles and the like.

The determination of the average size or volume of cells in a sample of blood is a very complex problem. Nevertheless, it is very useful information for clinical and diagnostic purposes when it can be obtained in an easy and accurate manner. Such information, however, heretofore has not been easy to obtain. Not only do red corpuscles of different blood samples vary greatly in number and size, but also vary greatly in shape, in hemoglobin concentration and in cell size distribution, etc.; with the result that the problems of determining the values mentioned above so as to have real meaning and accuracy for different samples by earlier known methods and apparatus have been difficult and time-consuming; and these values at best were often subject to such undesirable conditions as errors in counting, errors in pipetting, errors in chamber size, errors in dilution and the like.

The method of the present invention on the other hand provides a convenient, rapid and dependable manner by which average red blood cell volume and refractive index may be obtained; and from which such other useful information as cell diameter, and an indication of distribution of cell sizes in the specimen under consideration may be readily obtained.

It is, accordingly, an object of the present invention to provide a method by which a measure of average cell size, volume and refractive index may be obtained; and from this information, used in combination with a hematocrit reading, and accurate estimate of the total volume red cells per unit volume of whole blood may be more easily obtained than has been possible heretofore by known methods and apparatus.

It is another object of the present invention to provide a method whereby permanent records or graphs of values of the scattered light at a series of displacement distances indicative of average blood cell volume and refractive index for a sample may be obtained and used in analyzing the sample.

It is also an object of the invention to provide a method by which such graphs or permanent records may be made and used together with hematocrit values of blood samples to provide accurate indications as to the average number of red blood cells contained in unit volumes of the whole blood being analyzed.

Other objects and advantages of the present invention will become apparent from the detailed description which follows when taken in conjunction with the accompanying drawings in which:

FIG. 1 is a schematic view of a preferred form of optical system and associated apparatus for carrying out the method of the present invention;

FIG. 2 is a sketch showing in an enlarged and somewhat exaggerated manner geometric relationships of certain operative parts of the apparatus of FIG. 1 thereof;

FIG. 3 is a sketch similar to FIG. 2 for use in obtaining a better understanding of the invention;

FIG. 4 is a graph obtained by use of the apparatus of FIG. 1;

FIG. 5 is a fragmentary view of a part of the apparatus of FIG. 1 showing an annular light aperture used therein;

Figure 8:
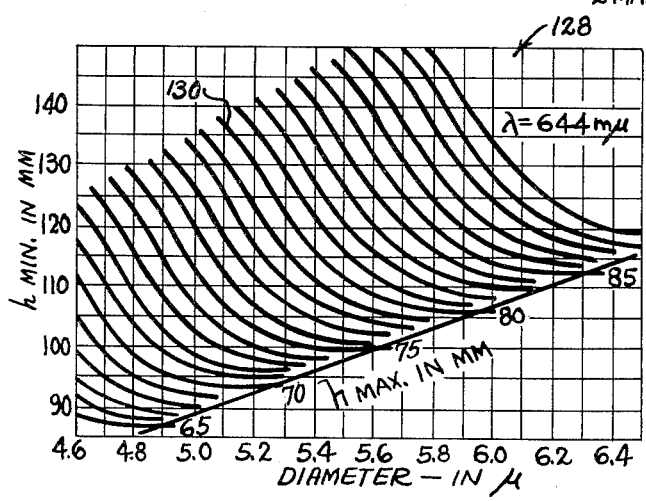
Figure 9:
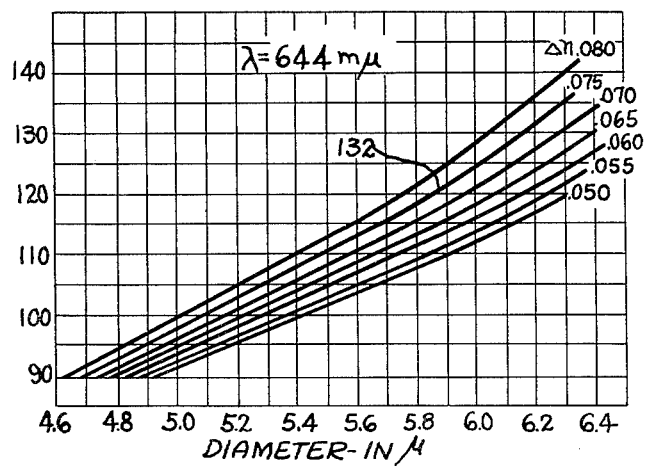
Figure 10:
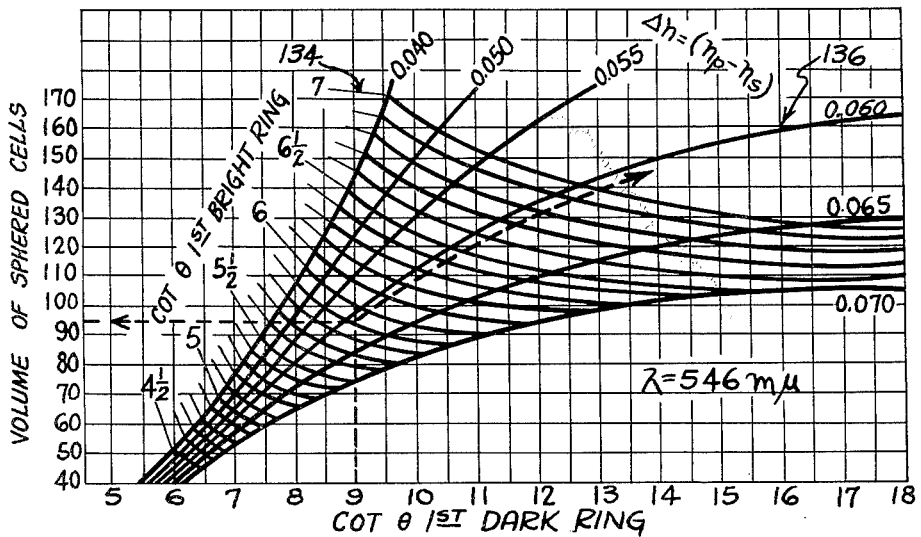

ratio values;

FIGS. 8 and 9 are two charts for joint use in determining diameter of particle and $\Delta n$, the difference in the refractive index of the particle and the refractive index of the associated dilution or suspension fluid; and FIG. 10 is a graph from which values of particle or cell volume and $\Delta n$ index values may be directly obtained.

Referring to the drawings in detail and particularly to FIG. 1, it will be seen that a preferred embodiment of the apparatus is indicated generally by the numeral 10 and comprises a transparent specimen holder 12 upon which may be positioned a small quantity of solution, suspension or the like containing a very large number of very small particles, such as red corpuscles in solution, to be analyzed. It is not only desirable for best results that this solution be of such dilution that no appreciable overlapping of particles occurs when light is being transmitted through a thin layer on the holder 12 and in a direction substantially normal to the plane of the holder but also desirable that the particles be spaced sufficiently so that none of the light passing one cell will be disturbed by an adjacent cell.

The sample holder 12 is carried upon an apertured stage 14 which is arranged to move, as indicated by the double-headed arrow 16, in a direction parallel to the optical axis 18 of a compound optical system 20 between a "near" position 22 and a "far" position 24 during operation of the apparatus. The optical system 20, as shown, comprises a pair of condensing lenses 26 aligned with a light source 28, a first surface reflector 30 for folding the system and directing the convergent beam of light received from the condenser fully and evenly toward a pinhole aperture 32 in an opaque diaphragm 34. Preferably, the light source 28 is a mercury vapor lamp and in order that monochromatic light of a preselected wave length, in accordance with the kind of specimen being considered, may be supplied at the pinhole 32, a color filter 36 of proper absorptive characteristics is employed where convenient between said source and the pinhole 32. A pinhole having a diameter of 0.3 mm. is acceptable.

The illuminated pinhole 32, it will be noted, is so disposed in axial alignment with a comparatively long focus objective 38 of said optical system that light received from said pinhole will be formed into a convergent beam 39 which is imaged as a very small spot at a focal plane 40. At the focal plane 40, a plate 41 is located. This plate 41 carries an opaque coating 42 which is of such configuration as to provide an inner opaque circular disk-like portion 44 and an outer encircling opaque portion 46 arranged in such concentric spaced relation to each other as to form a narrow annular slit or light aperture 48 having a predetermined mean radius R, and a slit width which for reasons to be later described is substantially equal to the width of the image of the pinhole 32 at plane 40. This annular aperture 48 is arranged in concentric relation with respect to the optical axis 18.

Thus it will be appreciated that substantially all light which passes through the illuminated pinhole 32 and which is transmitted by the objective 38 will impinge upon and be intercepted by the opaque disk-like portion 44 unless deviated or otherwise affected by other means in its path. This undeviated light in FIG. 1 when no blood sample or specimen is in place upon the sample holder 12 is indicated by solid lines or rays 39a and 39b. Dotted lines 51 on the other hand indicate rays which have been so deviated by an axial object point at the surface of the holder 12 as to pass through the annular aperture 48.

The sample holder 12 during normal use of the apparatus is intended, as stated above, to support a thin layer or smear of a specimen, for example, blood containing red corpuscles, in the light beam 39 so as to be analyzed. Of course, this layer will be of a sufficient area as to fully intercept the beam 39 for any and all positions of adjustment of the sample holder 12. Accordingly, when the beam of light 39 is illuminating a specimen on the sample holder 12, part of this light will be diffracted or scattered in varying quantities and different directions by each of the many small particles contained in the illuminated area. Accordingly, a certain part of this scattered light from each illuminated small object will travel towards the annular aperture 48 for each and every position of adjustment of the holder 12 between near and far positions 22 and 24 respectively. A much larger portion of the light beam, on the other hand, is undeviated and will be intercepted or blocked by the opaque central portion 44.

It will be appreciated from the description of FIG. 2 which follows that for each and every position of the holder 12 from its near position to its far position, the illuminated area of the layer may be considered merely as a collection of separate particles in which each particle will in effect contribute a hollow cone of scattered light in such directions as to pass through the annular aperture 48.

At any single position of adjustment of the layer, it should be noted, all light rays of such a cone will have substantially equal angles of deviation; and furthermore all cones from such an illuminated area will be for all practical purposes geometrically substantially equal to one another.

Accordingly, in axial alignment with the objective 38 and rearwardly of the annular aperture 48 and diaphragm plate 41 is positioned a pair of condensing lenses 50 for directing this transmitted light onto a diffusing plate 54 rearwardly thereof. The condensing lenses 50 are of such predetermined optical design and so located with reference to the diffusing plate, the annular aperture and the sample holder 12 that for all positions of the holder 12 not only will all the light passing through the aperture 48 be directed as a spot by lenses 50 toward the diffusing plate 54 but also so located that these lenses will have their best focus when the holder 12 is located intermediate the near and far positions 22 and 24. Thus, the out-of-focus spots produced by the scattered light upon the diffusing plate 54 for the near and far positions of the sample will be of substantially equal sizes.

Rearwardly of the diffusing plate 54 and suitably positioned with reference to the light received thereby is a light-sensitive device, such as a photomultiplier 56, for receiving this diffused light and producing an electrical current which is proportional to the intensity of the light energy being received. The use of this current will be described more fully hereinafter.

While in the disclosure of FIG. 1, an opaque disk 44 has been shown, it should be understood that other means for preventing direct light from reaching the photocell could be provided. In fact, the opaque disk 44 could be of dull black and substantially completely absorbing, or could be specularly reflecting and tilted so as to direct the light intercepted thereby laterally outwardly of the system, or even could be made of opaque material and of some controlled configuration so as to admit and trap the direct light rays within recessed areas thereof, the forwardly extending wall portions of such a light trap serving to prevent scattering of the direct light so received and thus avoiding detrimental conditions resulting therefrom. In such a light trap, of course, care should be taken to avoid reflection of any direct light directly back toward the specimen.

The sample holder 12 with a blood specimen thereon is intended, during use of the device, to occupy not only the near and far positions mentioned above but also all of the various positions therebetween. In order that the holder 12 will successively occupy these positions during consideration of a specimen, the support 14 in the present embodiment, is carried by a movable frame bar 58 which has formed on one side thereof a rack 60 adapted to mesh with a worm gear 62. The gear 62, in turn, is mechanically driven in known manner by electric motor 64 which is preferably arranged to move the sample holder 12 along the optical axis 18 at a slow uniform rate and in either direction from one extreme operative position to the other.

A recording table 66 for supporting a sheet of graph paper 68, or the like, in operative relation with respect to a scribing element 70 of a recorder 72, may be coupled (as shown) directly to the movable frame 58 so as to have simultaneous movement therewith. Alternatively, some other ratio than a 1 to 1 ratio of movement of the holder 12 relative to the table 66 could be arranged, if desired, by suitable mechanical or electrical means of known construction. However, for simplicity of disclosure, a direct coupled arrangement is shown.

The scribing element 70 is carried by an actuating arm 73 extending outwardly from a sensitive electric actuator 74 of the recorder 72 in such a manner as to move back or forth, as indicated by the double-headed arrow 76, in accordance with the amount of current being received by actuator 74. The photomultiplier is connected to a source of electrical energy 78 in such a manner that when light energy is received thereby during operation of the apparatus, a current will flow through the photomultiplier and through an electrical circuit 80 in which a load resistor 82 is arranged. The current which flows through the photomultiplier will be proportional to the intensity of the light energy being received thereby and thus the voltage drop across the load resistor 82 may be fed to a power amplifier 84 in known manner and the output current from this amplifier supplied to the recorder 72. (A .001 ampere full scale recording milliammeter has been found to give satisfactory results.) The recorder arrangement as shown in FIG. 1 is such as to cause the arm 73 to move inwardly from a zero position varying amounts in accordance with the amount of current flowing in circuit 80. In order to correlate the current intensities with the position of the sample in the convergent beam as it is moved toward or away from the aperture 48, it is very desirable to have a reference mark or marks placed on the graph paper and this may be accomplished, for example, by having the sample holder actuate an electrical switch, or the like, to momentarily interrupt the output current from the amplifier 84 as a fixed point is reached during the travel of the sample holder.

The arrangement of parts in FIG. 1 is such that when no sample is on the specimen holder 12, no scattering of light will occur and thus no light will be supplied to the photo tube 56. Consequently, no current will follow in circuit 80. At such time, the arm 73 will remain in its outer or extended position indicating a zero amplitude. However, if a sample is placed upon the holder 12 and the holder is moved axially by the motor 64 from its far position 24 to its near position 22, the light which is being scattered by the specimen at various angles of deviation relative to the optical axis 18 and in varying amounts at these different angles will be caused to successively pass through the annular aperture 48. In fact, it should be noted that all of the light being transmitted through the aperture 48 at any single instant is in effect in the form of a hollow cone of light all light rays of which are deviated by substantially the same angular amount.

The relationship of the deviated and undeviated light rays provided by the structure of FIG. 1 is of importance. Accordingly, an enlarged and somewhat exaggerated sketch is given in FIG. 2 in order that a clearer understanding of the invention may be obtained. In this sketch, it will be seen that undeviated light rays 39a and 39b define substantially the lateral limits of the beam 39 when no microscopic objects are affecting the beam and these rays are directed so that the beam forms a small spot of light upon the opaque disc-like portion 44. Of course, at the same time the beam will function to illuminate a small area of a smear or thin layer of material such as indicated at 88 upon the sample holder 12; and this illumination of the layer will take place no matter in what operative position along the optical axis 18 the holder 12 may be located.

It is well known that such a smear or specimen containing small objects will diffract or scatter light impinging thereon. Therefore, if an axially disposed particle 90 in the layer of solution 88 is considered, it will be appreciated that this particle located between near and far positions 22 and 24 and at a variable distance $h$ from the focal plane 40 will variously scatter light and some of this light will be directed toward and through the annular aperture 48 at any distance $h$, as indicated by deviated rays 90a and 90b. In fact, all of the light from axial particle 90 which is transmitted through the annular aperture 48 will have substantially the same angle of deviation $\theta$ with respect to the optical axis 18. If, on the other hand, an off-axis small object in the specimen 88 is considered, such as object 92 which in FIG. 2 is being illuminated by the converging light ray 39a, it will be appreciated that scattered light will variously radiate therefrom and this scattered light will include light rays 92a and 92b which travel toward diametrically opposite parts of the annular aperture 48. Even though small object 92 is shown somewhat off axis, it should be kept in mind that the illuminated area of the smear is at all times relatively small in comparison to the distance $h$ and thus rays 92a and 92b will have angular values $\theta_1$ and $\theta_2$ respectively which are relative to the undeviated light ray 39a substantially equal. This is largely due to the fact that undeviated light ray 39a is converging toward the optical axis 18 and thus nearly equally bisects the included angle between rays 92a and 92b. It should also be noted that these angular values $\theta_1$ and $\theta_2$ will be for all practical purposes very nearly equal to the angle $\theta$.

Such a favorable condition would not prevail, however, if for example parallel light were employed to illuminate the layer; for as is clear from FIG. 3, the illuminating beam could not be as large in diameter as the annular aperture 48 and also the off-axis rays of the illuminating beam would not provide substantially equal amounts of deviation for all scattered light from any small illuminated object to the annular aperture 48. This will be appreciated if off-axis small object 93, for instance, illuminated by one of the parallel rays 94, is considered. Clearly the angles $\theta_3$ and $\theta_4$ indicating the amounts of deviation of scattered light rays 93a and 93b respectively which pass through annular aperture 48 are not equal to each other. Nor is either substantially equal to $\theta$. Accordingly, such a mixture of deviations from all small objects in the illuminated area at any operative location of the axially movable support 12 would not give information which can be readily used to advantage in analyzing the specimen being considered.

A distinct advantage is gained by use of the optical arrangement of FIG. 1 over any arrangement whereby the diffracted or scattered light is measured by merely moving a small aperture and photometer or the like laterally so as to respond selectively to the scattered or diffracted light intensities at different angles of deviation from the optical axis, as has previously been suggested. The reason for such an advantage results from the fact that while the width of slit of the annular aperture 48 can be kept small so as to give a measurement at an exact angle of deviation, nevertheless, a comparatively large amount of light at such angle is provided by the hollow cone of light available since $\theta$, $\theta_1$ and $\theta_2$ are all substantially equal. On the other hand, if a small scanning aperture of a diameter equal to the width of the aperture 48 (in order to give an accurate indication) were used for scanning the diffracted light the intensity of the light being measured would be by comparison very small.

The present apparatus, on the other hand, due to the use of an annular light aperture instead of a pin hole or the like, has the distinct advantage of admitting a far greater amount of light all rays of which have substantially the same common angle of scattering or deviation $\theta$. Another important advantage which is also obtained from the optical arrangement employed is the fact that even though the scattered light intensity decreases rapidly as greater angles of scattering or deviation $\theta$ are considered, nevertheless, the amount of light reaching the photomultiplier is appreciably compensated at such times due to the fact that the particles of the specimen scattering the light are being moved closer to the aperture 48.

In actual practice, it has been found desirable to construct the apparatus so that the aperture 48 will have a mean radius R of approximately 14 mm. and so that the near and far positions 22 and 24, respectively, will be axially displaced from the diaphragm 42 approximately 20 mm. and 200 mm. respectively. (Other values for R for such an arrangement when other materials are being tested may range between 5 and 20 millimeters.) Furthermore, while a slit width of .5 mm. has been used successfully with a mercury green radiation for the annular aperture 48, other slit widths up to 4.0 mm. may be satisfactorily employed depending upon the available intensity of the mercury, cadmium, hydrogen, sodium or other light source and color selected in accordance with the material being tested. However, for best resolution, the narrower slit widths are preferred. If a width of pin hole aperture of 0.3 mm. is used with an objective having a magnification ratio of approximately 2 then an image of the pin hole 32 will be formed by the rays which will be approximately 0.6 mm. in width. The reason for selecting a mean radius of 14 mm. for the light aperture 48 is so that angular values of light deviation between 5 degrees and 20 degrees will be provided the light rays being acceptable through the aperture 48; it being known that such angular values in a diffraction pattern for blood specimens, for example, are the values of most significance.

Of course, a greater operating range can be employed if other degrees of deviation are to be recorded, and a range from approximately 1½° to 45° is possible.

In FIG. 4 is shown a graph having along the abscissa thereof lineal values for variable axial distance $h$ expressed in millimeters from 20 to 200 while along the ordinate thereof linear values for the amplified photo tube current J expressed in milliamperes from 0.0 to 1.4 are given. Upon this graph is shown a curve 96 like one actually traced by the apparatus of FIG. 1 while using monochromatic light at a wavelength of approximately 546 millimicrons and a sample of substantially normal blood. From this curve, it will be seen that a first dark ring occurs in the diffraction pattern when the sample is approximately 116 mm. from the diaphragm 42, and that a first bright ring occurs when the sample is approximately 77 mm. from the diaphragm. (It is also interesting to note that a second dark ring appears when the sample is approximately 58 mm. from the diaphragm and a second bright ring appears when the sample is approximately 45 mm. therefrom.) Other blood samples having different physical properties, will give curves having differing characteristics on such a graph.

As previously stated, all of the light rays of the beam 39 in FIG. 1 which are undeviated by the small particles are directed so as to impinge upon the opaque disc 44. If the construction is considered geometrically, it will be seen that that part of the light from any single illuminated small particle in the specimen which is scattered so as to pass as a hollow cone of light through the annular aperture 48 will have an angle of deviation substantially equal to $\theta$. At the same time the mean radius of the aperture will be R and the axial distance from the plane of aperture 48 to the specimen plane will be $h$. Thus, for all light which passes through the aperture 48 the geometric relationship which exists can be expressed as follows:

$$\sin \theta = \frac{R}{\sqrt{R^2 + h^2}} \quad (1)$$

Red blood cells of a specimen are of various sizes and of irregular shapes. It is known, however, that they may be rendered spherical in shape without change in volume by the use of a special diluting fluid containing a small amount lecithin. (See Hemolysis and Related Phenomena, by E. Ponder, published in 1948 by Grune and Stratton; New York, N.Y.) Red cells in the spherizing medium at approximately one-half to one part of blood and diluted in 100 parts of a suspension fluid may be used and placed in a conventional microscope mold counting chamber which will thus provide a specimen having a depth of 1/10 mm. and an area of approximately 20 mm. or more in diameter. Under such conditions the spherized cells will rest upon the bottom of the chamber and the random spacing thereof is such that a diffraction pattern will be produced which is independent of concentration.

The scattered light passing through the aperture 48 will be received by the phototube 56 and the current J for displacement of the recorder in the direction 76 will be proportional to the light intensity I scattered in the direction of the aperture 48 by the blood cells and inversely proportional to the square of the distance. Although the numbers of cells illuminated at different distances in the convergent beam are different, nevertheless, the change in number of cells illuminated at different distances is exactly compensated by the change in the light intensity thereon and thus the scattered light intensity in any direction will be constant; as if a constant number of cells are being illuminated by a constant amount of light. Thus $$J \propto \frac{I}{h^2 + R^2} \quad (2)$$

The displacement of the table 66 and of the graph carried thereby will be linearly proportional to $h$. Thus, the motion of the element 70 is proportional to the intensities of the diffraction pattern multiplied by the factor $(h^2+R^2)^{-1}$. Since the $\sin^2 \theta$ is equal to $$\frac{R^2}{h^2+R^2}$$

this factor becomes proportional to $\sin^2 \theta$.

If the particles in suspension are spheres of a radius $r$ and of an index of refraction $n_p$, and if the suspension fluid has an index of refraction $n_s$, and if the ratio $m$ of these two indices is closely to unity, then the light intensity I scattered by the spheres in the direction $\theta$ can be expressed as follows:

$$I = nF(\theta, m, \lambda, r) \quad (3)$$

wherein $n$ is the number of spheres and $\lambda$ is the wavelength of the light employed.

The amplitude A of such scattered light is given by a formula disclosed by Van de Hulst in an article "Optics of Spherical Particles" appearing in a Dutch publication "Recherches Astronomiques de L'observatoire d'Ultrecht by N. V. Drukkerij, Amsterdam 1945 and may be written as follows:

$$A = C \int_{-r}^{+r} \int_{-r}^{+r} (-1 + e^{i \cos \gamma}) e^{-i \sin \theta \xi} d\xi d\eta \quad (4)$$

and wherein $$\xi = r \sin \gamma \cos \phi \quad (5)$$

and $$\eta = r \sin \gamma \sin \phi \quad (6)$$

and wherein $\theta$ and $\gamma$ are variables of integration and vary from 0 to 90° and from 0 to 360° respectively, and C is a constant depending on the wavelength of the light used and on the number and radious of the spheres being considered.

The function F then will be given by the sum of the squares of the real and imaginary parts of the amplitude A.

In the Expression 3 the variables $m$, $r$, $\lambda$ and $\theta$ appear in the following combinations $$Z = \frac{2\pi}{\lambda} r \sin \theta \quad (7)$$

$$\rho = \frac{2\pi 2r(m-1)}{\lambda} \quad (8)$$

and wherein the wavelength is measured in the suspension fluid. Since it is more convenient to measure the wavelength in air, the Expression 3 may be rewritten as follows:

$$I = F(Z, \rho) \quad (9)$$

and wherein $$Z = \frac{2\pi r \sin \theta}{\lambda \text{ air}} \quad (10)$$

and for $\Delta n = n_p - n_s$ $$\rho = \frac{2\pi 2r(\Delta n)}{\lambda \text{ air}} \quad (11)$$

It will be appreciated that particles such as blood in addition to scattering also absorb light in accordance with the wave length used, so that the Expression 3 in order to give the right results for the cases where absorption is present will have to be modified so as to take into account this effect. If the diffraction integral (4) is modified to include absorption, the amplitude value will be:

$$A = C_e^{-2r\alpha_s} \int_{-r}^{+r} \int_{-r}^{+r} \left[ -1 + e^{\rho \cos \gamma \left(i - \frac{\Delta \alpha \lambda}{\Delta n 2\pi}\right)} \right] e^{-i \sin \theta \xi} d\xi dn \quad (12)$$

wherein $\alpha_s$, $\alpha_p$ and $\Delta \alpha$ are extinction coefficients of the surround, the sphere or particle respectively and $$\Delta \alpha = \alpha_p - \alpha_s$$

Once Equation 12 has been integrated, the intensity is equal to:

$$I = G(Z, \rho, K) \quad (13)$$

wherein $Z$ and $\rho$ are given in Equations 10 and 11 and $$K = \frac{\Delta \alpha}{\Delta n} \frac{\lambda}{2\pi} \quad (14)$$

In the case of red blood cells, $K$ may be assumed to be approximately constant for a particular wavelength; since $$\alpha_p = D[Hb] \quad (14a)$$

$$n_p = E[Hb] + n_0 \quad (14b)$$

where $D$ and $E$ depend on wavelength only and $[Hb]$ is the concentration of hemoglobin in the blood cells. The index of the red cells has been found to be very closely given by $E[Hb] + n_0$, since $n_0$ does not differ substantially from the index of the suspension fluid mentioned supra, both $n_0$ and $n_s$ being close to the index of refraction of water.

Assuming $\alpha_s = 0$, which is always the case with the liquids here used the following can be written:

$$K = \frac{D[Hb]\lambda}{(E[Hb] + n_0 - n_s)2\pi} \approx \frac{\lambda D}{2\pi E} \quad (15)$$

Thus, the preceding formula shows $K$ to be dependent upon and substantially constant for any given wavelength.

It will be clear from the preceding description that Equation 13 solves the direct problem of finding the relative light intensity scattered by a sphere of known characteristics and relative index of refraction close to unity and in a direction $\theta$ relative to the incident light.

Due to the geometric arrangement employed, the light as "seen" by the phototube will be proportional to the inverse square of the distance between any particle in the specimen and any point in the annular aperture. This inverse square distance is proportional to $\sin^2 \theta$ and since for a given sphere the radius $r$ is a constant, the inverse square distance will be proportional to $Z^2$ and the scattered light intensity as used will be given by the following:

$$I' = G(\rho, Z, K) Z^2 \quad (16)$$

Equation 16 will now permit us to predict the curve (see FIG. 4) which will be obtained by the instrument if $\Delta n$, $r$, $K$, $\lambda$ were given. However, to obtain useful information from the instrument, we must solve an indirect problem; that is, given a curve as in FIG. 4 what are the characteristics $r$ and $\Delta n$ of the spheres under investigation which will be given such a curve?

This question can be answered with the following procedure. For a given color, the value of $K$ in Equation 15 is determined from the known values of the extinction coefficients of the blood cells, the extinction coefficient of the surround $\alpha_s$ being equal to zero for all visible wavelengths.

Figure 6:
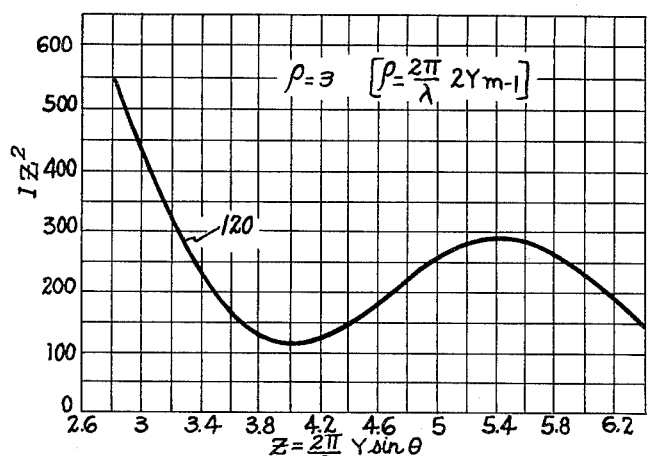
FIG. 6 is a chart showing a theoretical curve of scattered light intensities plotted against a dimensionless parameter for use in interpretation of an actual curve like that of FIG. 4.

For simplicity $K$ is selected equal to zero for the cadmium red line. $\lambda = 644$ millimicrons, (since for this color $\alpha_p = 0$). With this fixed value for $K$, a family of curves $I'$ versus $Z$ can be plotted for any value of $\rho$ by means of Equation 16. One such curve for $\rho = 3$ and $Z$ from 2.6 to 6.4 is shown in FIG. 6. Other curves for other values of $\rho$ could also have been plotted on this figure, if desired. A number of curves (like that shown in FIG. 6) have been plotted for discrete values of $\rho$ between 3 and 5.8. All of these curves present one minimum and one maximum for certain values of $Z$ depending upon the value of $\rho$ employed.

Figure 7:
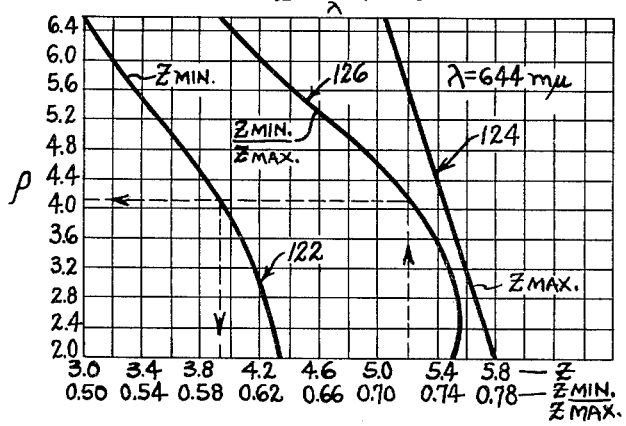
FIG. 7 is a chart showing values of $\rho$ the retardation value of the light passing centrally through a spherical particle or the like plotted against $Z_{min}$ and $Z_{max}$ values and also against $$\frac{Z_{min}}{Z_{max}}$$

Using all of the curves obtained for the different values of $\rho$, a plot of $\rho$ versus $Z$ minimum (i.e. for all values of $Z$ for which a minimum of $IZ^2$ occurs in FIG. 6) and $\rho$ versus $Z$ maximum are obtained as shown at 122 and 124 in FIG. 7.

By inspection of FIG. 7, it will be seen that the curve 126 for the ratio $Z_{min}$ to $Z_{max}$ determines uniquely (within certain limits) the three values $Z_{min}$, $Z_{max}$ and $\rho$. Since the ratio $$\frac{Z_{min}}{Z_{max}} = \frac{\sin \theta_{min}}{\sin \theta_{max}}$$

can be measured directly, the right-hand quantities being given by the experimental curve, it is possible, by the use of FIG. 7 and charting from the experimental ratio value, to find $Z_{min}$ and $\rho$.

Once $Z_{min}$ has been found $r$ can be determined from Equation 10. Knowing the values for $r$ and $\rho$, the value for $\Delta n$ can be determined by solving Equation 11. Thus, the useful information $r$ and $\Delta n$ are obtained.

In order to avoid the laborious procedure of obtaining the diameter and the $\Delta n$ values for the spheres or cells from the curve of FIG. 4 by using the curves on FIG. 7, the curves of FIGS. 8 and 9 have been plotted. In FIG. 8, there is shown a chart wherein a family of curves 128 for values for $h_{min}$ in millimeters (along the ordinate) and diameter values of particles in microns (along the abscissa), the wavelength for such purpose having been taken as equal to 0.644μ. The construction of FIG. 8 was determined in the following manner. Select a certain value for $h_{min}$, $$\left( \text{which corresponds to a } \sin \theta_{min}. \text{ of } \frac{R}{\sqrt{R^2 + h^2_{min}}} \right)$$

and a certain $h_{max}$ value, for example 78 mm., $$\left( \text{which corresponds to a } \sin \theta_{max}. \text{ value of } \frac{R}{\sqrt{R^2 + h^2_{max}}} \right)$$

and then from the ratio $$\frac{\sin \theta_{min}}{\sin \theta_{max}}$$

and using the procedure explained above relative to FIG. 7, the value of the diameter of the spherical particle may be determined from the curves 122 or 124 and 126 in FIG. 7. A point corresponding to $h_{min}$ and diameter of sphere is entered in FIG. 8; and this procedure is repeated until a sufficient number of $h_{min}$ points at suitable intervals have been established, without changing the $h_{max}$ value. All the points with the same $h_{max}$ form a curve, such as curve 130.

FIG. 9 shows a plot of $h_{min}$ versus diameter of spheres for different values of $\Delta n$. This figure was constructed by first selecting a value of $\Delta n$, for example .075. Once $\Delta n$ is established, the $h_{min}$ corresponding to selected values of the diameters of the spheres can be calculated using curve 122 of FIG. 7, and the corresponding values of $\rho$ obtained by using Equation 11 to find the value of $Z_{min}$. Once $Z_{min}$ is determined, Equation 10

$$Z_{min} = \frac{2\pi r}{\pi} \sin \theta_{min}$$

may be solved for $\sin \theta_{min}$, and by using $$\cot \theta = \frac{h}{R}$$

obtain $h_{min}$. By keeping $\Delta n$ constant and varying $h_{min}$ a plurality of points may be determined. Thus, a curve connecting a series of these points may be drawn and labeled with the appropriate value of $\Delta n$, and one such curve is designated by the numeral 132 in FIG. 9.

In the curve of FIG. 8, it is possible to enter immediately the value of $h_{min}$ and the value of $h_{max}$ and obtain therefrom the diameter of the spheres or cells. If a value for $\Delta n$ is also desired, then in FIG. 9 enter the values for $h_{min}$ and the diameter so determined from FIG. 8 to obtain a value for $\Delta n$. Such $\Delta n$ values are of clinical significance since they are believed to be closely related to the specific hemoglobin concentration of the blood cells (see Eq. 14b).

It is possible to combine the information of FIGS. 8 and 9 into a single graph in several different ways and one such way is shown in FIG. 10. In this figure enter the cot $\theta_{\min}$ value for the first dark ring $$\left(\cot \theta_{\min.} = \frac{h_{\min.}}{R}\right)$$

along the abscissa and proceed vertically until the correct value for cot $\theta_{\max}$ of the first bright ring $$\left(\cot \theta_{\max.} = \frac{h_{\max.}}{R}\right)$$

is reached in the first family of curves designated by the numeral 134 and from the point indicated thereby obtain a value for the volume of the spheres on the ordinate of the graph and obtain a $\Delta n$ value from the other family of curves indicated by the numeral 136.

This graph has been scaled so that for an instrument value of R, the abscissa has the same scale as the traced curve. The curved lines for the maximums of the traced curves have been connected with the corresponding values of the abscissa so that cot $\theta_{\max}$ scale also corresponds to the instrument tracing. In this arrangement, the computation of volume and refractive index may be carried out completely by graphical means without any computation or reference to numerical values. A convenient arrangement for this graphical procedure would be to overlay the properly scaled transparency of FIG. 10 on the traced curve. One could then follow lines from the minimum and maximum of experimental curve to an intersection point which would directly indicate values of volume and index difference, $\Delta n$.

While the curves of FIGS. 7, 8 and 9 have been plotted for transparent spheres using R equal to 16.5 mm. and $\lambda$ equal to 644 m$\mu$ (for which radiation blood cells are transparent and therefore K may be taken as equal to zero), on the other hand the curves of FIG. 10 have been plotted for absorbing spheres since the mercury green line (546 m$\mu$) was used in this case and therefore K was taken as equal to 0.083.

It is desirable for visual comparison purposes to keep curves similar to the curve shown in FIG. 4 (when obtained from sphere of a similar kind but while using a radiation of a different wavelength for illumination) as independent as possible of wavelength. Accordingly, the radius R of the aperture 48 in the preceding paragraph (16.5 mm.) was selected in such a way as the keep Z, one of the parameters on which such curves depend, independent of wavelength. Since $$Z \approx \frac{2\pi r R}{\lambda h}$$

and wherein $$\frac{R}{h} \approx \sin \theta$$

for small values of $\theta$, it will be immediately seen that Z will not depend appreciably on $\lambda$ if $$\frac{R}{\lambda}$$

is kept constant. In practice R is made equal to 14

$$\frac{\lambda}{546}$$

and accordingly for the 644 radiation of the cadmium red line R was made equal to $$\frac{14 \text{ mm.} \times 644}{546} = 16.5 \text{ mm.}$$

Of course, 546 and 644 are the wavelengths in m$\mu$ of mercury green and cadmium red radiations respectively.

When the volume of individual blood cells can be determined as described above, this information can be used with hematocrit values of the blood specimens to give other useful information, such as the number of cells per unit volume of whole blood.

In order to obtain an estimate of size distribution of spherical particles or spherized cells, the mean size is first determined by the above-described procedure. Then a curve of the specimen under consideration is compared with the theoretical curve for spheres of average size. The difference in modulation between these two curves will be an indication of the size distribution. (The word modulation as used herein is intended to mean the ratio of difference of the intensities at the first maximum and the first minimum to the sum of the same values.)

The instrument may also be used to obtain an indication of mean diameter and diameter distribution of cells which have not been spherized but which are contained in a known suspension fluid; for example, red cells in suspension in their own serum. The procedure to obtain a curve from the instrument is the same as with spherized cells but the interpretation of this curve to obtain an indication as to means diameter and diameter distribution is accomplished in such cases by comparing these curves with blood cell curves of known characteristics. Of course, a correct value for mean cell volume cannot be obtained from diameters thus obtained since the cells will not be of spherical form. The diameter distribution indication obtained in this way may be due both to actual variation in diameters, amounts of departure from spherical shape, or various combinations of these two factors.

This application is a division of co-pending application Serial No. 650,518 filed April 3, 1957, which issued January 31, 1961, as U.S. Patent 2,969,708.

Having described our invention, we claim:

1. The method of determining the average size and the refractive index of a relatively large number of microscopic particles of varying sizes distributed at random in a light-transmitting fluid medium of known refractive index, said method comprising forming said medium into a relatively thin layer having an appreciable exposed area and with the microscopic particles therein dispersed so that no appreciable overlapping of particles occurs, passing monochromatic light of a preselected wavelength through said layer so as to illuminate the particles therein and produce a pattern of scattered light, separately collecting and measuring substantially all of the light scattered at each different preselected angle of scattering, and plotting on a record sheet a curve indicative of the total intensity of the collected light at each different angle of scattering, said curve indicating the amount of deviation and the intensity at which a first maximum and a first minimum in brightness in said scattered light pattern on said plotted curve occur, forming a calibrated graph having two families of intersecting curves thereon, the co-ordinate scales of said graph and the positioning of said families of curves thereon being so controlled relative to the range of particle sizes, relative to the range of refractive index differences between said medium and the particles therein and relative to the range of first maximum and first minimum for said particles that mean particle size may be read directly on a first one of said scales on said graph and mean refractive index difference may be read directly on a second one of the scales thereon in accordance with the locations indicated by said first maximum location and by said first minimum location on said record sheet when disposed in registry therewith, and positioning said graph in registry with said record sheet so that said locations on said record sheet will be indicated on said graph.

2. The method of determining the average size and the refractive index of a relatively large number of blood cells of varying sizes distributed at random in a specimen of blood, said method comprising forming said specimen into a relatively thin layer having an appreciable exposed area and with the blood cells therein dispersed so that no appreciable overlapping of cells occurs, passing monochromatic light of a preselected wavelength through said layer so as to illuminate the cells therein and produce a pattern of scattered light, separately collecting and measuring substantially all the light scattered at each different predetermined angle of scattering, and plotting on a record sheet a curve indicative of the total intensity of the collected light at each different angle of scattering, said curve indicating the amount of deviation and the intensity at which a first maximum and a first minimum in brightness in said scattered light pattern on said plotted curve occur, forming a calibrated graph having two families of intersecting curves thereon, the coordinate scales of said graph and the positioning of said families of curves thereon being so controlled relative to the range of cell sizes, relative to the range of refractive index differences between said specimen and the cells therein and relative to the ranges of first maximum and first minimum for said cells that mean cell size may be read directly on a first one of said scales on said graph and mean refractive index difference may be read directly on a second one of the scales thereon in accordance with the locations indicated by said first maximum location and by said first minimum location on said record sheet when disposed in registry therewith, and positioning said graph in registry with said record sheet so that said locations on said record sheet will be indicated on said graph.

3. The method of determining the average size and mean refractive index of a relatively large number of microscopic particles of varying sizes distributed at random in a fluid medium of known refractive index, said method comprising forming said fluid medium into a relatively thin layer having an exposed area of appreciable size and with said microscopic particles so dispersed therein that no appreciable overlapping of particles occurs, directing a convergent beam of monochromatic light of a preselected wavelength and coming from a relatively small high intensity light source through said thin layer and toward an image plane in conjugate relation to said light source, said beam serving to form an image of said light source at said image plane and to illuminate the microscopic particles of said thin layer in such a manner as to produce a pattern composed of rings of scattered light of differing intensities in concentric relation to said light source image, separately measuring the total amount of scattered light of each different narrow ring of said pattern and recording on a graphic record sheet a curve indicating in one direction on said sheet the various different intensities for the light being scattered by said thin layer and in another direction on said sheet values indicative of the various different angles of deviation of the scattered light intensities, said curve being such as to indicate the location of a first maximum bright ring portion and the location of a first minimum dark ring portion on said scattered light pattern, forming a calibrated graph having two families of intersecting curves thereon, the coordinate scales of said graph and the positioning of said families of curves thereon being so controlled relative to the range of particle sizes, relative to the range of refractive index differences between said medium and particles therein and relative to the ranges of first maximum and first minimum for said particles that mean particle size may be read directly on a first one of said scales on said graph and mean refractive index difference may be read directly on a second one of the scales thereon in accordance with the locations indicated by said first maximum location and by said first minimum location on said record sheet when disposed in registry therewith, and positioning said graph in registry with said record sheet so that said locations on said record sheet will be indicated on said graph.

4. The method of determining the average size and mean refractive index of a relatively large number of red blood cells of varying sizes distributed at random in a fluid sample of blood of known refractive index, said method comprising forming said fluid sample into a relatively thin layer having an exposed area of appreciable size and with said blood cells so dispersed therein that no appreciable overlapping of cells occurs, directing a convergent beam of monochromatic light of a preselected wavelength and coming from a relatively small high intensity light source through said thin layer and toward an image plane in conjugate relation to said light source, said beam serving to form an image of said light source at said image plane and to illuminate the blood cells of said thin layer in such a manner as to produce a pattern composed of rings of scattered light of differing intensities in concentric relation to said light source image, separately measuring the total amount of scattered light of each different narrow ring of said pattern and recording on a graphic record sheet a curve indicating in one direction on said sheet the various different intensities for the light being scattered by said thin layer and in another direction on said sheet values indicative of the various different angles of deviation of the scattered light intensities, said curve being such as to indicate the location of a first maximum bright ring portion and the location of a first minimum dark ring portion on said scattered light pattern, forming a calibrated graph having two families of intersecting curves thereon, the coordinate scales of said graph and the positioning of said families of curves thereon being so controlled relative to the range of cell sizes, relative to the range of refractive index differences between said specimen and the cells therein and relative to the ranges of first maximum and first minimum for said cells that mean cell size may be read directly on a first one of said scales on said graph and mean refractive index difference may be read directly on a second one of the scales thereon in accordance with the locations indicated by said first maximum location and by said first minimum location on said record sheet when disposed in registry therewith, and positioning said graph in registry with said record sheet so that said locations on said record sheet will be indicated on said graph.

References Cited in the file of this patent

UNITED STATES PATENTS

| | | |
|---|---|---|
| 1,974,522 | Twyman et al. | Sept. 25, 1934 |
| 2,769,365 | Loeschke et al. | Nov. 6, 1956 |
| 2,788,702 | Baum | Apr. 16, 1957 |
| 2,816,479 | Sloan | Dec. 17, 1957 |